United States Patent [19]

Stella

[11] Patent Number: 5,618,420

[45] Date of Patent: Apr. 8, 1997

[54] CONTAINING, RETRIEVING AND STORING OIL SPILLS

[76] Inventor: Carl J. Stella, 164 Ridge Rd., Bristol, Conn. 06010

[21] Appl. No.: 253,291

[22] Filed: Jun. 3, 1994

[51] Int. Cl.⁶ ............................................. E02B 15/021
[52] U.S. Cl. ...................... 210/242.3; 210/923
[58] Field of Search .................. 210/242.3, 242.4, 210/776, 923, 924

[56] References Cited

U.S. PATENT DOCUMENTS

| | | | |
|---|---|---|---|
| 3,314,540 | 4/1967 | Lane | 210/923 |
| 3,338,414 | 8/1967 | Lefke et al. | 210/923 |
| 3,358,838 | 12/1967 | Kosar et al. | 210/242.3 |
| 3,426,902 | 2/1969 | Kilpert et al. | 210/923 |
| 3,612,277 | 10/1971 | Van Stavern | 210/923 |
| 3,617,556 | 11/1971 | Cole | 210/242.4 |
| 3,618,768 | 11/1971 | Brown | 210/923 |
| 3,679,058 | 7/1972 | Smith | 210/242.4 |
| 3,702,297 | 11/1972 | Maksim, Jr. | 210/242.4 |
| 4,642,185 | 2/1987 | Turner et al. | 210/242.3 |
| 4,957,636 | 9/1990 | Wilson et al. | 210/242.3 |
| 4,960,347 | 10/1990 | Strange | 210/923 |
| 4,964,758 | 10/1990 | Pekelny | 210/923 |
| 5,030,363 | 7/1991 | Pole | 210/776 |
| 5,043,064 | 8/1991 | Abell et al. | 210/242.3 |
| 5,051,181 | 9/1991 | Sandkvist | 210/242.3 |
| 5,056,957 | 10/1991 | Wood, Jr. | 210/923 |
| 5,071,545 | 12/1991 | Ashtary | 210/923 |

*Primary Examiner*—Christopher Upton

[57] ABSTRACT

Separate devices for removing oil from water where no tank or vessel is required next to the skimmer since the scraper is at an angle from the horizon designed to flow oil away from the skimmer into a tube to a pump and can be used in confined areas, shallow water or for industrial use to remove oil. Skimmers are designed to retrieve oil in any type of weather conditions. The containment boom is made of a flexible material rolled in a tight bundle having 2 compartments where water and air are pumped, having relief valves with flexing joints to insure containments during high waves. The oil is pumped into sacks which are stored in canisters on the sides of the tanker for quick release.

6 Claims, 6 Drawing Sheets

Cross Section

Side View

CONTAINING, RETRIEVING AND STORING OIL SPILLS

BACKGROUND OF THE INVENTION

Field of the Invention

The present invention relates to a series of retrievers designed to recover oil spills in warm, cold, calm or stormy weather, a containment enclosure which is several inches to several feet above the water and flexes with the swells insuring containment; a series of canisters housing pleated sacks to store the oil.

Description of Prior Art

Several methods and apparatuses have been presented to recover oil spills but are only effective in calm water. No account is taken for heavy bunker oil and oil in frigid water which becomes almost solid in mass. Most of the retrievers are on small manned vessels which have small holding capacities and can only operate in calm water.

SUMMARY OF THE INVENTION

This invention covers several devices to recover oil and other chemical spills which may occur in the ocean, lakes, small bodies of water or in confined vessels and can be used in extremely shallow waters. This invention also makes provision to pick up spills that may occur in any type weather be it warm, cold, rough or calm; thereby, providing a method for recovery that prior art has not been able to do. Tankers can carry the appropriate retrievers corresponding to the type oil carried and location of the area be it frigid or warm. These retrievers are designed for high volume pickup, wherein the oil can immediately be pumped to a storage container. Prior art has small manned vessels with limited storage capacity whereby the vessel moves through the spill restricting its use to calm conditions.

During stormy conditions the gang plate or the helix will retrieve oil no matter what the weather or type of oil spill. When these two retrievers are withdrawn from the water, the tanks below are closed where the oil is either pumped or dumped over an open tank when in an open position.

There have been many types of barriers, floating booms in prior art which again do not address rough conditions of the water. Some are attached to the vessel and no consideration is taken into account of the oil that passed underneath the boom during cresting of the waves. This invention addresses containment for rough water with flexing joints to cover the swells of the water.

Prior art does not contain spills in rough water due to the construction limiting the height above the water. This invention will contain all of the spill as the vessel deploys the barrier. This invention has canisters on the side of the vessel storing sacks which are released immediately.

DESCRIPTION OF THE PREFERRED EMBODIMENTS

Figure 1:
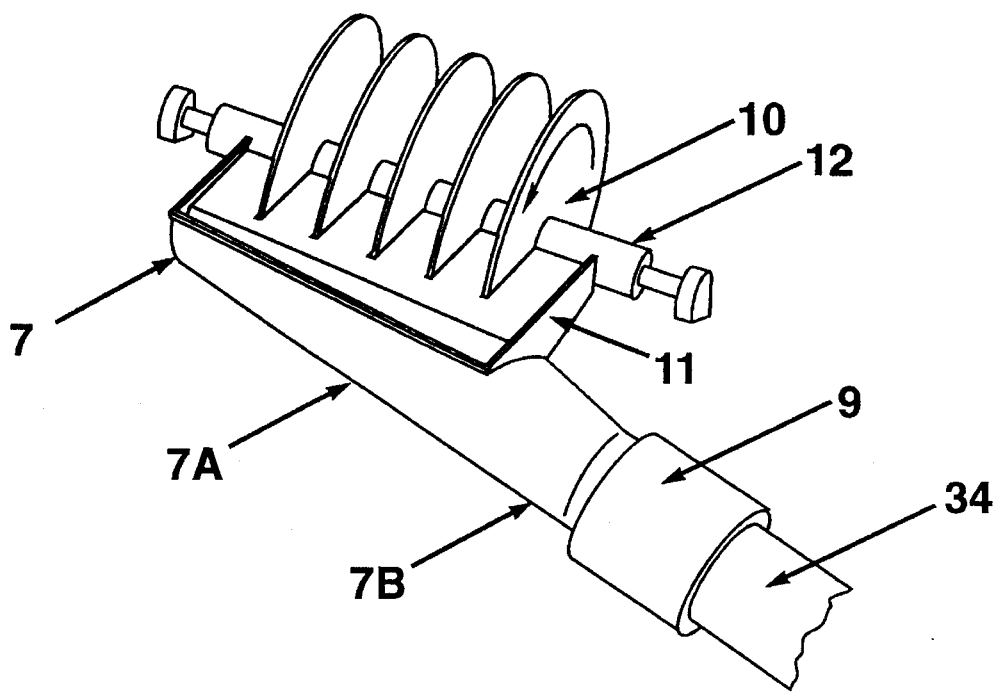
FIG. 1. shows a disc skimmer with a scraper blade angular to the horizon increasing in circumference to a tube with a pump.
Figure 1A:
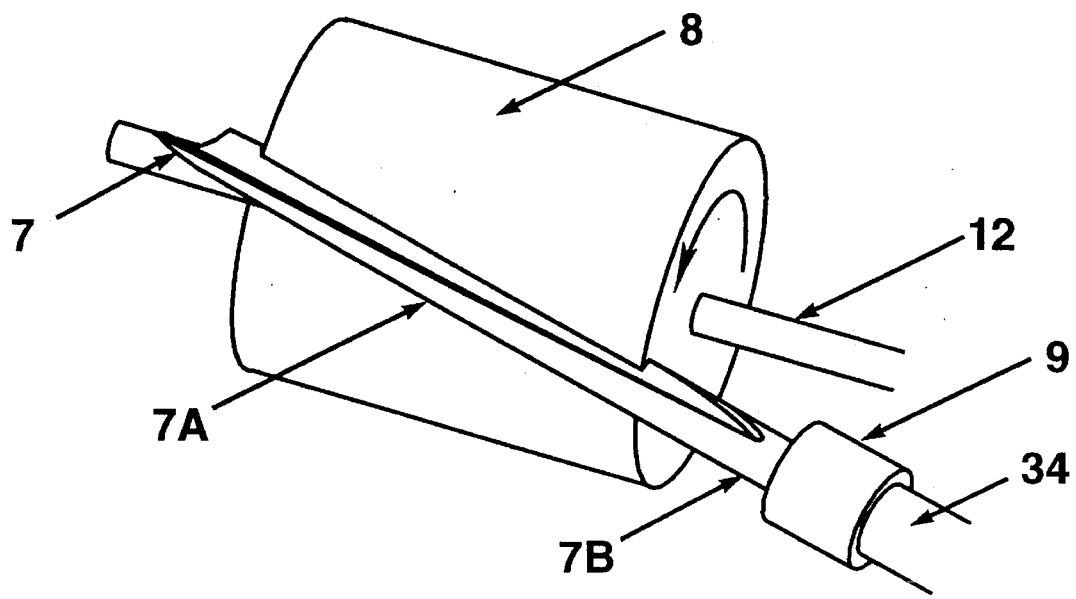
FIG. 1A. shows a drum skimmer with a scraper blade angular to the horizon increasing in circumference to a tube with a pump.

The primary embodiment of this invention is the scraper blades 7 as shown on FIGS. 1 and 1A, which are not horizontal, but form a compound curve in an angular status to the horizon, becoming semi-circular 7A proximate to the retriever 8. As it traverses downward, the semi-circle increases in circumference becoming a tube 7B. This design allows the retriever to be independent of a tank next to the retriever 8, 10. The diameter of the scraper 7 is dependent upon the oil carried. The tube 7B is attached to a pump 9, wherein the oil is pumped to a pleated sack 31 by a tube 34. The drum 8 is rotated around the shaft 12, which is attached to the pontoons 33.

FIG. 1A is a driven drum skimmer 8 as described above and FIG. 1 is a disc skimmer 10 rotating around a shaft 12.

Figure 2:
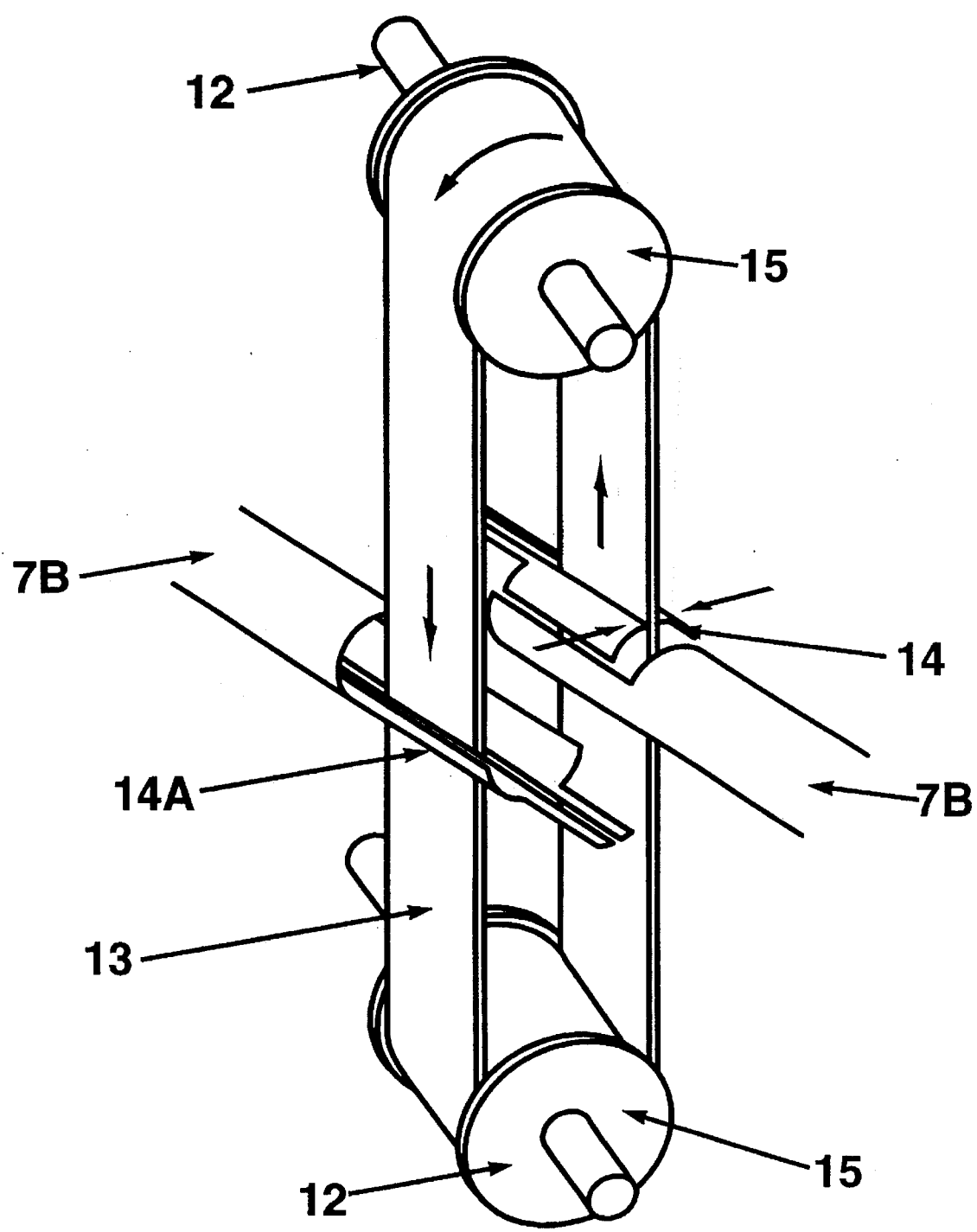
FIG. 2. shows a belt skimmer with scraper blades angular to the horizon curving into a tube.

FIG. 2 is a belt skimmer having scraper blades 14 which are semi-circular, removing the oil into a curved semi-circular form 14A which becomes a tube 7B. The belt 13 may be operated in a continuous travel with the scraper blades 14 and tube 7B angular to the horizon. The belt skimmer FIG. 2 may be operated in an alternating up and down travel, where the belt 13 travels up to a limit switch and then reverses in travel to a limit switch. This method would allow the belt skimmer FIG. 2 to be used in any position. When the belt 13 is in the upward travel, the scraper 14 is in the closed position. When the belt 13 is in the downward travel, the scraper 14 is in the open position. The belt 13 is held in place by spools 15 rotating around shafts 12.

Figure 3:
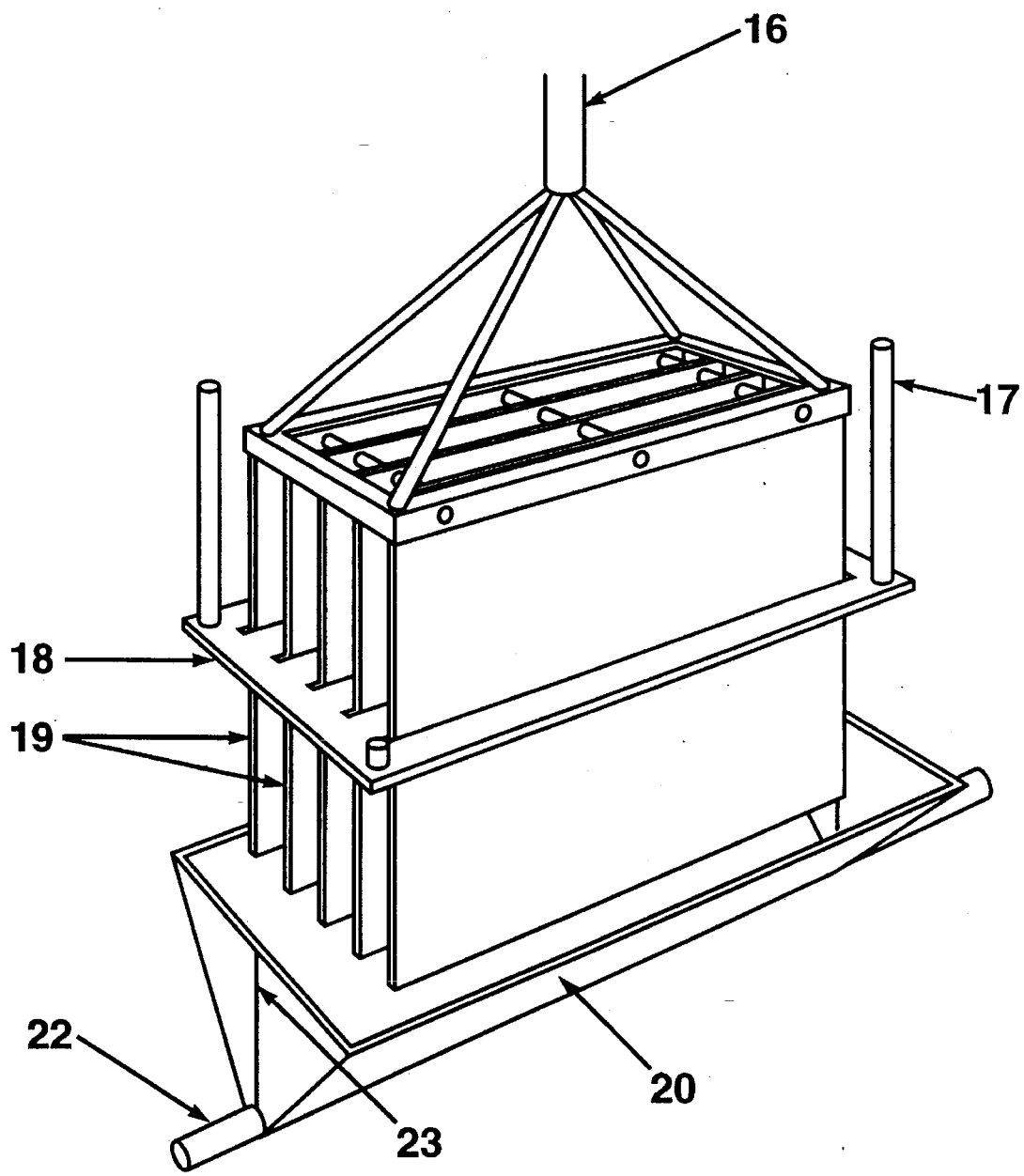
FIG. 3. Shows a gang plate skimmer with a scraper blade removing oil into a tank.
Figure 4:
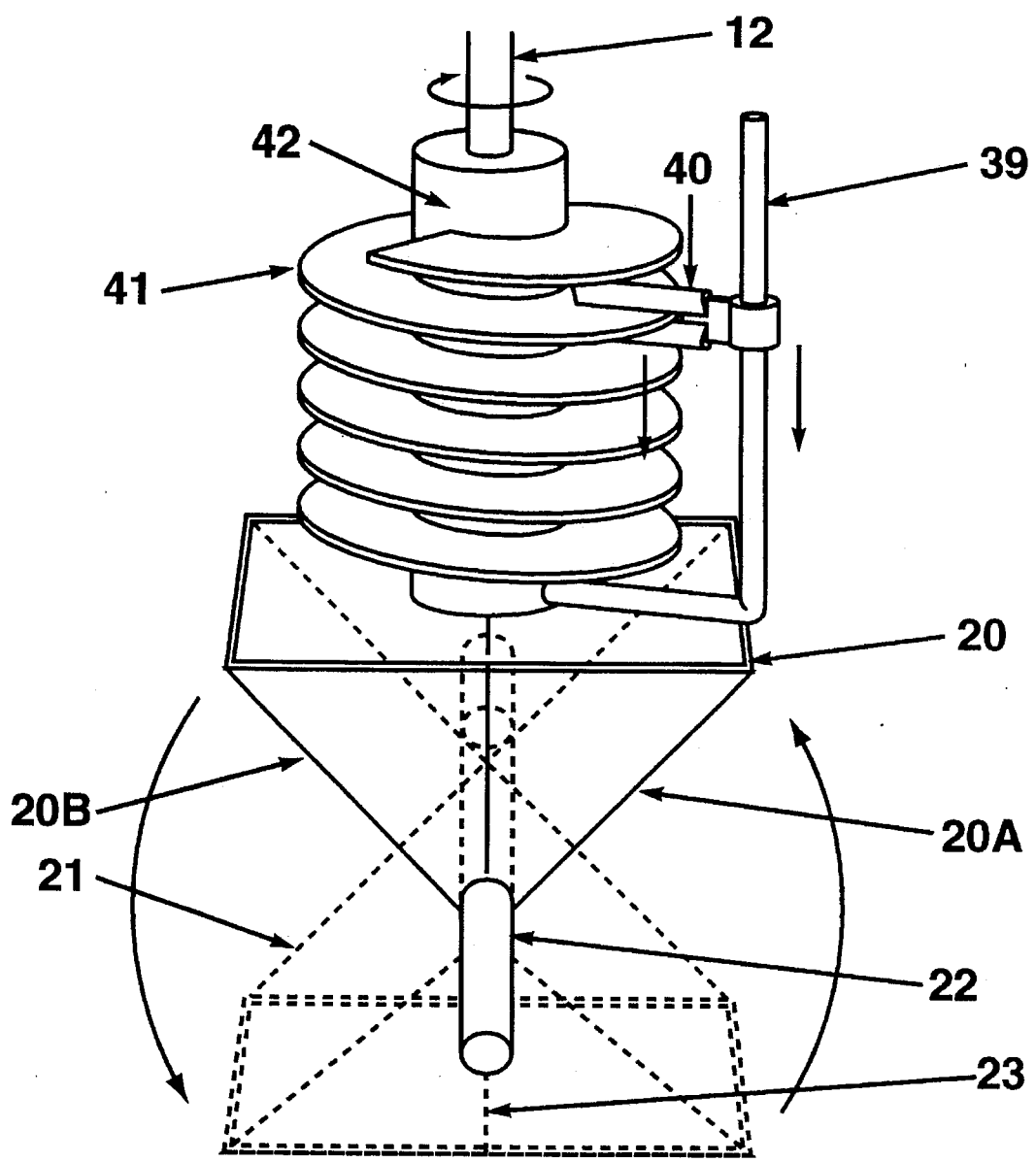
FIG. 4. Shows a helix skimmer with a scraper blade removing oil into a tank.

FIG. 3 shows a gang plate retriever having many plates 19 which are positioned close to each other to hold a solid mass of oil between them. The scraper blade 18 is operated by the supports 17. The tank 20 below the retriever FIG. 3 and 4 is constructed in 2 halves 20A and 20B. In FIG. 4 the dotted lines 21 shows the tank 20 in the open position. In the closed position 20A and 20B are put together and sealed tight 23, holding the oil which can be pumped from the pipe 22 for storage. When a tank or vessel is available, the gang plate may be placed over a holding tank and the tank 20 opened, releasing the oil.

FIG. 4 shows a helix type retriever with a tank 20 beneath it. The helical turns 41 are attached to the drum 42, which in turn is held by the shaft 12. After the helix is withdrawn from the spill and placed over a tank or to be pumped to a tank, the shaft 12 turns and the scraper blade 40 removes the oil as the scraper blade 40 is guided by the stabilizing arm 39. After the oil has been scraped, the drum 42 is reversed and the scraper blade 40 stops at the top of the helix 41. The tank 20 operates as in FIG. 3.

Figures 5, 5A:
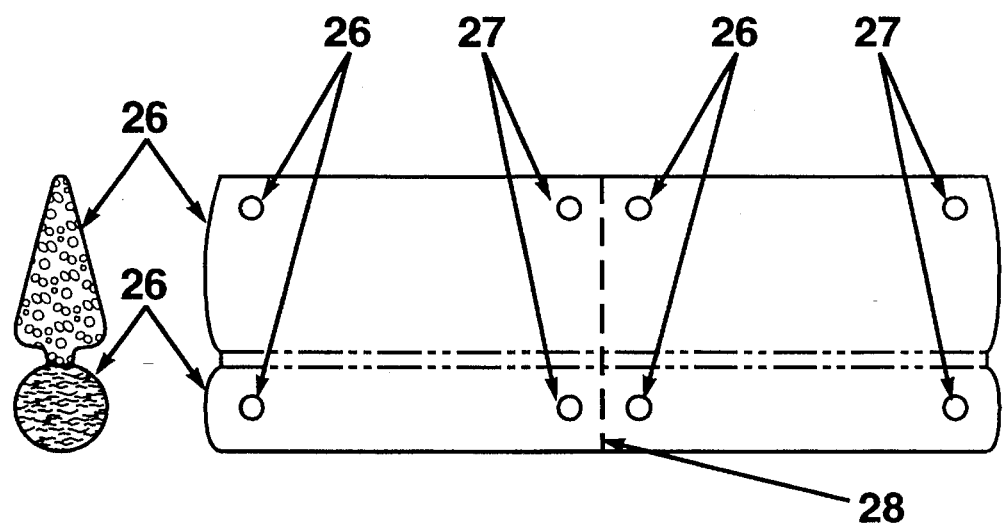
FIG. 5. Is a side view of the barrier used to contain the spill.
FIG. 5A. is a cross section of the barrier.

FIG. 5 is the containment or barrier boom which is made in 2 sections 24 and 25, 24 is filled with water and 25 is filled with air as shown in FIG. 5A cross section. Between each section 25, there is a flexing joint 28 to allow expansion over the waves, wherein the spill will be contained in rough water, allowing the barrier to expand on the top of the waves. A series of one-way valves 27 allows water and air to be pumped into each respective section. These valves 27 are designed to allow a quick slip connection to expedite deployment. Valves 26 are designed to maintain a designated amount of pressure. When the pressure is exceeded, the excess air and water is expelled during the retrieving of the barrier. As it is being wound up the water and air is removed through the one-way valves 26 by the increased pressure.

Figure 6:
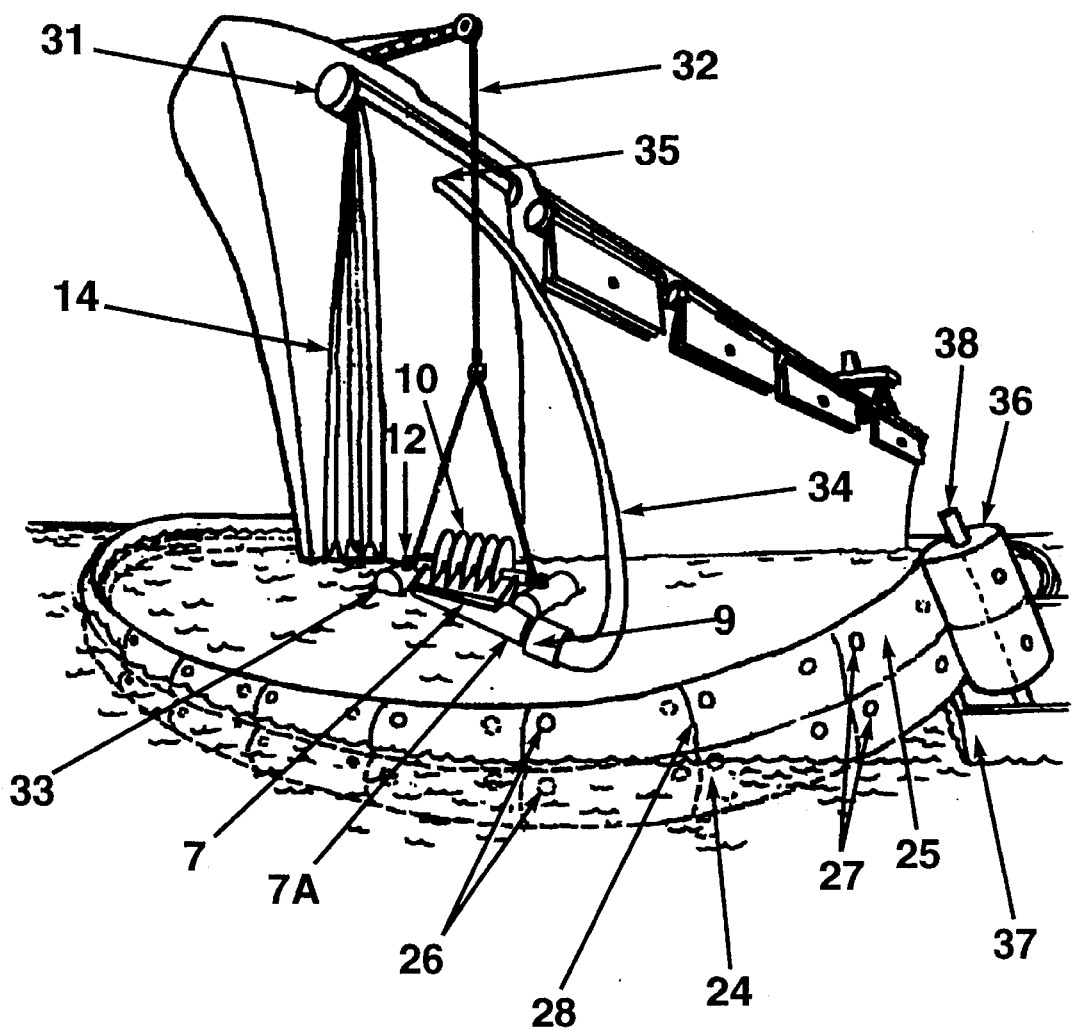
FIG. 6. Is a perspective view showing the deployment of the barrier embodiment, the storage sacks released from a canister, and a disc skimmer showing the angular scraper leading to a tube to a pump wherein the tube is attached to the sack.

FIG. 6 shows combined usage. The canisters 30 show the pleated sack 31 released with the hose 34 from the pump 9 entering the one-way valve 35 in the pleated sack 31. The crane holding the disc skimmer supplies current for operating the disc skimmer which is held up by the pontoons 33. The barrier 36 held by the shaft 38 is being deployed by the small vessel 37 wherein air and water are pumped into 27.

I claim:

1. A system for containing and recovering oil spills from a vessel comprising: barrier means for containing the spilled oil, said barrier means and a means for deploying said barrier means being carried by said vessel; skimmer means for collecting said oil, said skimmer means comprising a rotating oil collection means, scraper means for removing said oil from said collection means, and pump means for pumping said oil; and collapsible storage means carried by said vessel for storing said collected oil; wherein said scraper means contacts said collection means at angle to the horizontal, said scraper means is of semi-circular cross section where said scraper means contacts said collection means, said semi-circular cross section increases in circumference to a circular, tubular cross section at a lower end of said scraper means, and said pump means is connected to said lower end of said scraper means.

2. A system as claimed in 1 further comprising the barrier means having two compartments, wherein a lower compartment of said barrier means has a one-way valve means to pump water into it, and an end of said lower compartment having a pressure relief valve means to maintain a predetermined amount of water; and wherein an upper compartment of said barrier means contains air with a one-way valve means for filling and a pressure relief valve at an end to maintain predetermined air pressure.

3. A system as claimed in 1 further comprising flexing joints in said barrier means.

4. A system as in claim 1 wherein said collection means is a rotating drum, belt or plurality of parallel discs.

5. A system as in claim 1 wherein said collection means is a belt skimmer means having means to operate in an alternating upward and downward travel and having angular scraper blade means which are closed in upward travel and open in downward travel.

6. A system as in claim 1 wherein canisters store said collapsible storage means for immediate deployment.

* * * * *